United States Patent [19]

Fallon et al.

[11] Patent Number: 4,566,476

[45] Date of Patent: Jan. 28, 1986

[54] FLOW CONTROL DEVICE

[75] Inventors: Merton R. Fallon, Thousand Oaks, Calif.; Thomas Clements, Ambler, Pa.

[73] Assignee: Draft Systems, Inc., Northridge, Calif.

[21] Appl. No.: 717,446

[22] Filed: Mar. 29, 1985

[51] Int. Cl.[4] ............................................ F16K 17/14

[52] U.S. Cl. .................................... 137/71; 137/519; 137/68.1

[58] Field of Search ...................... 137/68 R, 71, 519; 220/89 A, 260

[56] References Cited

U.S. PATENT DOCUMENTS

| | | | |
|---|---|---|---|
| 2,163,401 | 6/1939 | Loudenbeck | 137/68 R |
| 2,962,038 | 11/1960 | Bird | 137/68 R |
| 3,426,779 | 2/1969 | Corbin | 137/68 R |
| 3,618,626 | 11/1971 | Russo | 137/68 R |
| 3,648,893 | 3/1972 | Whiting | 137/68 R X |
| 3,930,517 | 1/1976 | Gagala | 137/71 X |
| 4,219,040 | 8/1980 | Fallon | 137/68 R |

*Primary Examiner*—Harold W. Weakley
*Attorney, Agent, or Firm*—James E. Brunton

[57] ABSTRACT

A safety flow control device for use in a beverage distribution system of the character using pressurized gas to dispense the beverage from its containers for ensuring that the containers are not accidentally overpressurized. The device of the invention is adapted to be placed in the line which connects the pressure source to the containers for the beverage. The device embodies a rupture disc having a first side exposed to the gas used in pressurizing the containers and a second side exposed to atmosphere. Strategically positioned between the pressure inlet of the device and the pressure side of the rupture disc is a valving mechanism which is maintained in an open configuration by the rupture disc. In the open configuration the valving mechanism permits the gas to flow from the inlet into a first sub-chamber defined by the first side of the rupture disc and then outwardly through the outlet of the device. When the rupture disc fails, the valve mechanism will automatically close preventing further flow of gas into the first sub-chamber and toward the outlet. The valve is constructed so that it will remain closed until pressure on the inlet side of the unit is relieved.

10 Claims, 4 Drawing Figures

FLOW CONTROL DEVICE

BACKGROUND OF THE INVENTION

1. Field of the Invention

The present invention relates generally to fluid flow control devices. More particularly, the invention concerns a safety device for use in beverage distribution systems which positively prevents overpressurization of the beverage containers forming a part of the distribution systems.

2. Discussion of the Prior Art

In beverage distribution systems and particularly those used for beer, a pressure source is usually connected to a manifolding subsystem which is in turn connected to one or more kegs of beer through a tapping mechanism. The tapping mechanism permits the dispensing of beer from the keg under the pressure provided from the source. Safety devices have been employed in beverage installations of this kind to control the amount of pressure delivered to the keg. Otherwise, should a failure occur somewhere upstream of the keg tapping mechanism, the keg itself may become overpressurized to such an extent that it could very well explode or at least blow portions of the keg tapping mechanism with such force as to cause catastrophic consequences to those in the area of the keg. Safety devices used for this purpose have typically been mechanically adjustable and employed moving mechanical devices which are subject to frequent failure and blockage.

For adjustable safety devices the mostcommon technique has been the use of a spring bias release valve with various adjusting devices. There have also been attempts to incorporate safety relief valves in the pressure reducing regulator to control pressure delivered from the source. Unfortunately, the use of these adjustable regulators allow even a well-intentioned operator to adjust the regulator in a manner which cancels the effect of any safety mechanism. For example, when the operator hears the hissing noise that occurs when gas pressure begins being vented from the safety relief valve, and, knowing that this involves a gas leakage, he may adjust the safety relief valve to stop the leakage. In doing so, the relief valve may be bottomed out completely invalidating its existence or use.

Other prior art approaches to the problem have included the installation of safety relief valves in the beverage container itself. This has not proved to be completely satisfactory. By installing the relief valve inside the beverage container, it is continually exposed to the beverage product being dispensed from that container. As these products are by their very nature sticky, they adversely affect the predictability of the valves with which the beverage comes in contact. In other words, as the sticky beverage material permeates the interstices of the valve mechanism, elements of the mechanism may become adhered to one another to such an extent that it will not work properly, if at all.

With regard to the spring bias relief valve system generally used in the connection apparatus, they are also subject to the major disadvantage of their constant exposure to the beverage itself. As mentioned above, the beverage is sticky and as it dries, it forms a reasonably effective glue which causes the lifting or actuating pressure of the valve itself to vary widely. Because of this variation, the spring bias release system is one which is found to be unreliable and unsafe.

Another major disadvantage is that these safety valves are normally incorporated into some other component element of the dispensing system. They are usually employed with the coupler body of the coupler device which is used to interconnect the beverage container with the dispensing hoses and faucets. Because of the limitations in space and costs imposed on these systems, it is necessary that the safety system also be sufficiently small to work within the coupler. As a result of this size limitation, the safety valves may not provide an adequately large orifice through which to expel the excessive gases being applied from an overpressured or malfunctioning gas pressure regulator.

The pressure systems used with beverage distribution systems may require a source gas pressure of up to 1000 pounds per square inch. This, of course, varies substantially with temperature, but the normal pressure involved is usually around 800 pounds per square inch. If the reducing regulator on the gas cylinder should fail, allowing full bottle or source pressure to flow into the gas pressure feedline, the gas will achieve flow rates of on the order of 60 to 100 cubic feet per minute. The size of the expulsion orifice in the existing safety relief valves are so small that they will not achieve the same flow rate at the same source pressure. More importantly, the upper safe limit of the keg pressure, which is much lower than the source pressure, will achieve a limited flow rate of only 17 to 21 standard cubic feet per minute. In other words, if they are not glued shut by the beverage residue and they lift at the proper pressure, they will not provide sufficient flow rate to safely vent the system. Their proper actuation merely delays the explosive rupture of the beverage container some fraction of a second or perhaps two seconds at the most, depending on whether the container is completely filled or partially filled with the beverage at the time of failure.

Because the beverage containers are placed within coolers and other storage places, there is also always the possibility of a blockage of the safety valve. In fact, in some coolers, the six packs of beverage cans or bottles, packages of meat, vegetables and other products are frequently refrigerated in restaurant environments and placed on or adjacent these valve mechanisms in such a way that block or prevent their actuation.

One of the most effective devices ever devised to solve the prior art problems set forth herein is the device disclosed in U.S. Pat. No. 4,219,040 which issued to one of the co-inventors of the present invention. The device of the invention herein described represents a further improvement over the device of U.S. Pat. No. 4,219,040 in that the undesirable venting of the gas to atmosphere is prevented by means of a unique safety control valve which has been incorporated into the design of the unit.

In beverage dispensing systems, carbon dioxide and nitrogen are frequently used as the pressurizing source gases. With the device of U.S. Pat. No. 4,219,040 overpressurization of the system will causes the rupture disc of the device to fail satisfactorily preventing over pressurization of the beverage containers, but permitting the source gas to flow to atmosphere. In such a case, flow will continue until the gas source is depleted. Where gas generators or large volume pressure tanks are used, either singly or in series, to supply the source gas, substantial quantities of gas can be lost if the failure of the burst disc is not promptly discovered. This dumping of large volumes of gas can itself create a significant safety hazard. For example, when CO2 is used as the source gas, and the system is installed in a relatively small room, risks of asphyxiation or hypoxia become substantial. Even in larger rooms, since CO2 will sink to the floor, if a workman should fall and remain on the floor for any length of time, hypoxia can result causing death or serious injury to the workman. Additionally, where the safety device of U.S. Pat. No. 4,219,040 is incorporated into systems using other, more toxic source gases, dumping of the source gas to atmosphere can be even more catastrophic unless regular monitoring of the system takes place.

The device of the present invention uniquely overcomes all of the drawbacks of the prior art safety devices by providing a device which not only prevents overpressurization of the beverage container but also prevents dumping of the source gas to atmosphere in the event of overpressurization of the system.

SUMMARY OF THE INVENTION

The present invention generally relates to a safety flow control device for use in a beverage distribution system for ensuring that the containers of pressurized beverage are not overpressurized. More specifically, the device is placed in the line which connects the pressure source to the containers for the beverage. The device embodies a rupture disc having a first side exposed to the gas used in pressurizing the containers and a second side exposed to atmosphere. The rupture disc is housed in such a way that it is substantially tamperproof ensuring that the rupture disc will not be inadvertently broken until the pressure on the pressure side of the disc has reached an unacceptable level.

Disposed between the pressure inlet of the device and the first, or pressure, side of the rupture disc is a valving mechanism which is maintained in an open configuration by the rupture disc. In the open condition the valving mechanism permits the gas to flow from the inlet into a first sub-chamber defined by the first side of the rupture disc and then outwardly through the outlet of the device. When the rupture disc fails, the valve mechanism will automatically close preventing further flow of gas into the first sub-chamber and toward the outlet. The valve is constructed so that it will remain closed until pressure on the inlet side of the unit is relieved.

Another object of the invention is to provide a safety device of the aforementioned character which prevents overpressurization of a beverage container through the use of a frangible membrane which ruptures at a predetermined safe pressure level.

It is another object of the invention to provide a safety flow control device of the character described which, upon failure of the membrane, automatically stops all flow of gas through the device or to atmosphere. In this way, contamination of the atmosphere and costly waste of the source gas are uniquely prevented.

It is yet another object of the invention to provide a safety flow control device which is both tamperproof and highly reliable and also one which can be inexpensively produced and easily and quickly installed by unskilled workmen.

It is still a further object of the invention to provide a safety device which, when actuated, cannot be corrected in any other way than by depressurization of the system and total replacement of the frangible membrane portion of the device.

DISCUSSION OF ONE FORM OF THE INVENTION

Figure 1:
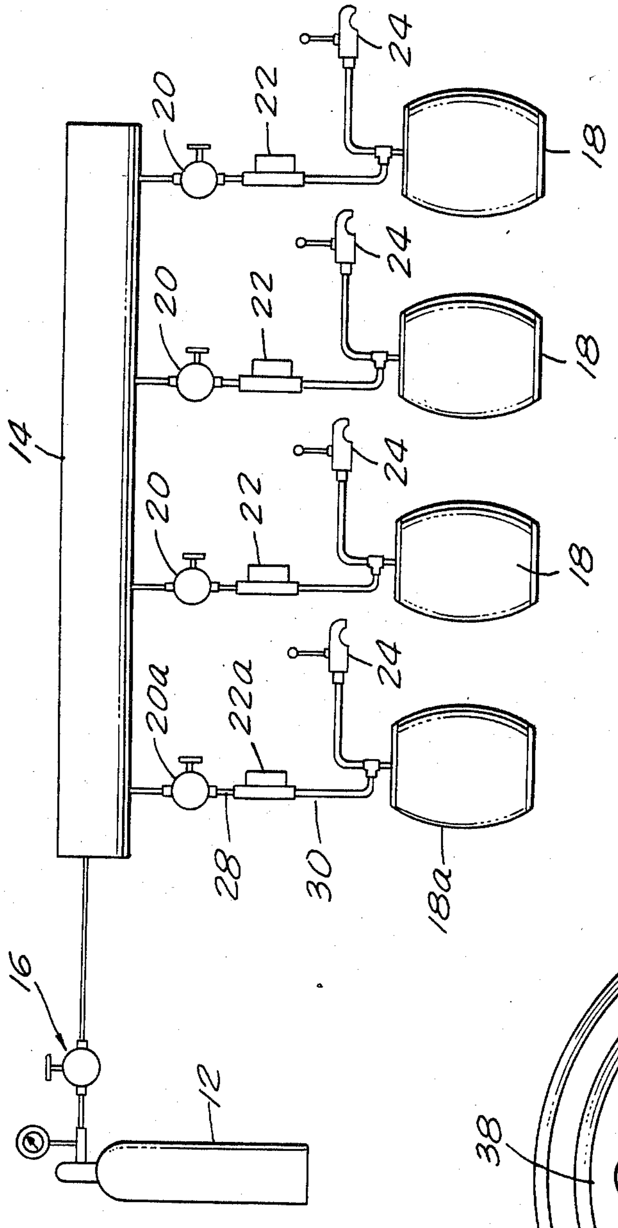
FIG. 1 is a generally diagramatic view showing a pressure source interconnected with the manifolding system which is in turn connected to a plurality of kegs of beer. The safety devices of the present invention are shown disposed between the manifolding system and each keg.

Referring to the drawings, and particularly to FIG. 1, there is shown a source of gas at elevated pressure, namely, a gas bottle 12, which is interconnected with a manifolding subsystem 14 through a conventional pressure regulator 16. Interconnected with the manifolding sub-system 14 are a plurality of containers shown here as beer kegs 18. Disposed intermediate each keg 18 and the manifolding sub-system 14 is a second pressure regulator 20. Interposed between regulator 20 and the keg 18 is the safety, or flow control, device of the present invention, generally designated by the numeral 22. Each of the kegs 18 is provided with a tapping mechanism which permits the dispensing of beer from the keg to a remotely located faucet 24.

The gas source 12 is typically carbon dioxide when the system is used for dispensing of beer and may be at a pressure of up to 1,000 pounds per square inch. Other gases such as nitrogen may also be used for other applications. The manifolding subsystem 14 is typically constructed of a heavy walled metal and is, in itself, usually capable of withstanding source gas pressures of at least 1,000 pounds per square inch. Accordingly, if regulator 16 were to fail, the manifolding sub-system would typically be able to accommodate the source gas at full pressure without the risk of catastrophic failure.

As previously mentioned, a second pressure regulator 20 is disposed intermediate each keg 18 and the manifold 14 so that pressure to the keg can be controlled. The flow control device 22 of the present invention, which is disposed intermediate regulator 20 and the keg, functions to prevent catastrophic overpressurization of the keg 18 in the event of failure or misuse of regulator 20.

Figure 2:
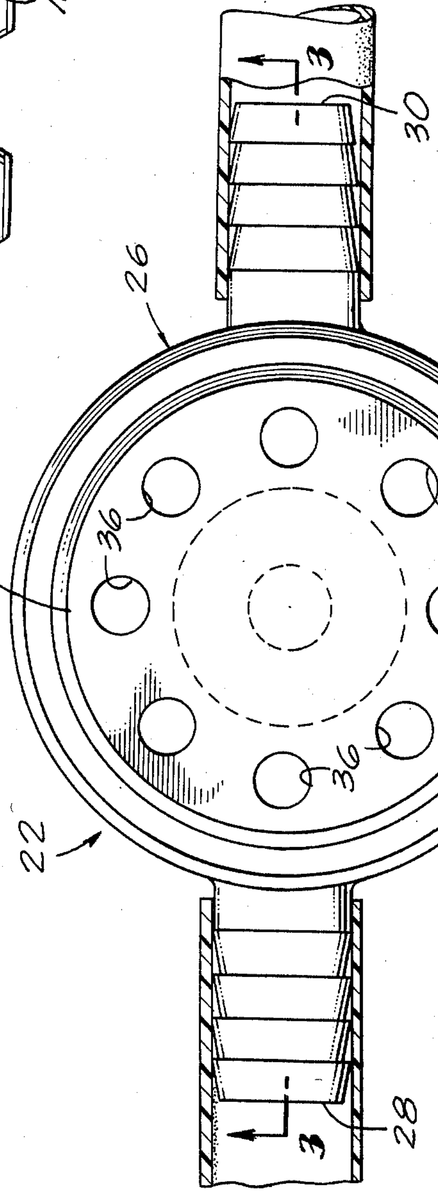
FIG. 2 is a top view, partly in section, of the flow control device of the invention, illustrating the configuration of the tamper proof upper cover of the device.
Figure 3:
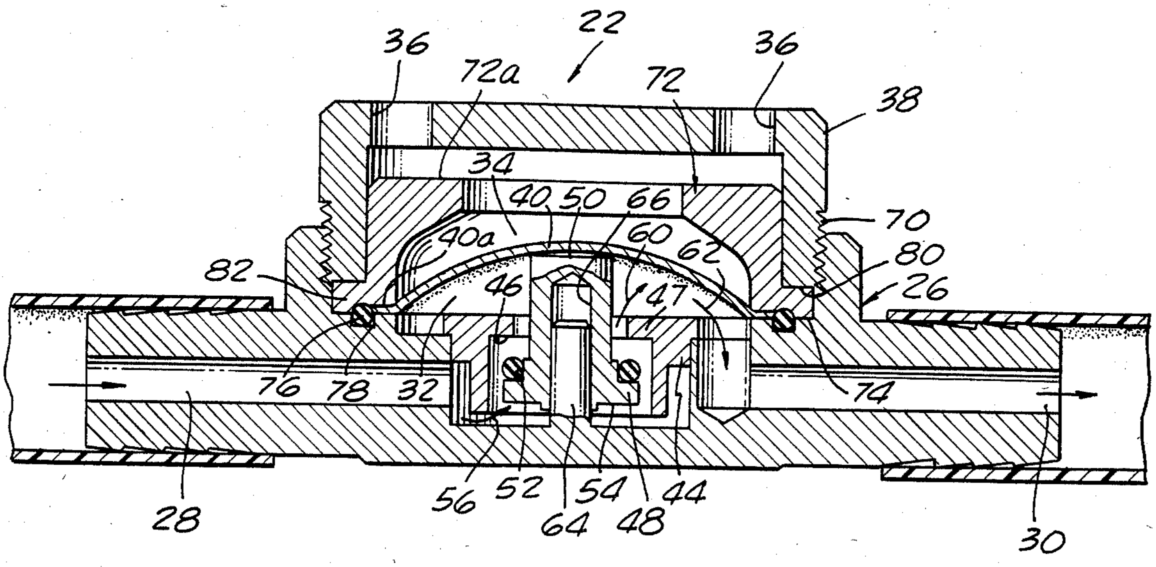
FIG. 3 is a side elevation, cross-sectional view of the flow control device of the invention, showing the frangible membrane of the device intact.

Turning now to FIGS. 2 and 3, the flow control device of the instant form of the invention comprises a housing 26 having an inlet 28 adapted to communicate with a source of pressurized fluid such as gas bottle 12 and an outlet 30 adapted to communicate with the beverage container, or beer keg 18. Housing 26 has a pressure chamber 32 which is in communication with both inlet 28 and outlet 30. Housing 26 also has a vented chamber 34 which is in communication with atmosphere through a plurality of apertures 36 provided in a cover member, or closure cap, 38 (FIG. 1).

Separating pressure chamber 32 and vented chamber 34 is a frangible membrane, or rupture disc 40. Rupture disc 40 is precisely constructed of a thin metal or other durable material and is specifically designed to fail or rupture when a predetermined excessive pressure is reached within pressure chamber 32.

Forming a unique aspect of the flow control means of the present invention is valve means disposed in housing 26 in cooperative association with frangible disc 40. The valve means functions to block the flow of fluid from the inlet 28 into the pressure chamber 32 when the frangible disc fails and the valve means closes. In the present form of the invention, the valve means comprises a generally cylindrically shaped valve body 44 having a circular shaped seat 46 defined by an inturned flange 47. As indicated in FIG. 3, seat 46 is disposed within chamber 32 intermediate inlet 28 and outlet 30. Also forming a part of the valve means of this embodiment of the invention is a generally cylindrically shaped valve member 48 which is provided with a seat engaging portion adapted to sealably engage the valve seat 46. Valve member 48 also has a spaced apart dome shape surface 50 which is normally disposed in engagement with the pressure side of the frangible disc 40 (the lower side of the disc as viewed in FIG. 3). In the form of the invention illustrated in the drawings, the seat engaging portion includes an elastomeric O-ring 52 which is adapted to sealably engage the valve seat 46 when the valve member 48 is moved into a sealing position in a manner presently to be described.

At the opposite extremity of the valve member 48 from surface 50 is a pressure or first surface 54 which can be acted upon by fluid pressure entering the device through inlet 28. The fluid under pressure entering inlet 28 follows the path of the arrow 56 in FIG. 1 into the area of pressure surface 54. Fluid pressure acting on surface 54 tends to move the valve member 48 from a first position wherein the valve means is open toward a second position wherein the valve means is closed. A unique aspect of the device of the invention resides in the fact that the frangible disc 40 is so constructed and arranged as to block movement of the valve member 48 to the second or closed position so long as the frangible disc 40 remains intact and unruptured. This normal position of the valve member 48 and the unruptured frangible membrane 40 is illustrated in FIG. 3.

With the various complements of the device in the position shown in FIG. 3, fluid under pressure can enter the device through inlet 28 pass into the valve means, as indicated by the arrow 56, and pass upwardly into the pressure chamber 32 along the path indicated by the arrow 60 of FIG. 3. So long as the fluid under pressure entering the pressure chamber remains below a predetermined level, that is a pressure less than that required to rupture the rupture disc, the fluid will continue to flow into the outlet 30 of the unit along the path indicated by the arrow 62 in FIG. 3. Under this condition, and so long as the fluid pressure within pressure chamber 32 remains below a predetermined level, the valve means will be maintained in an open position because first surface 50 of valve member 48 will engage disc 40 and will be prevented from further movement toward the second, closed position of the valve.

Figure 4:
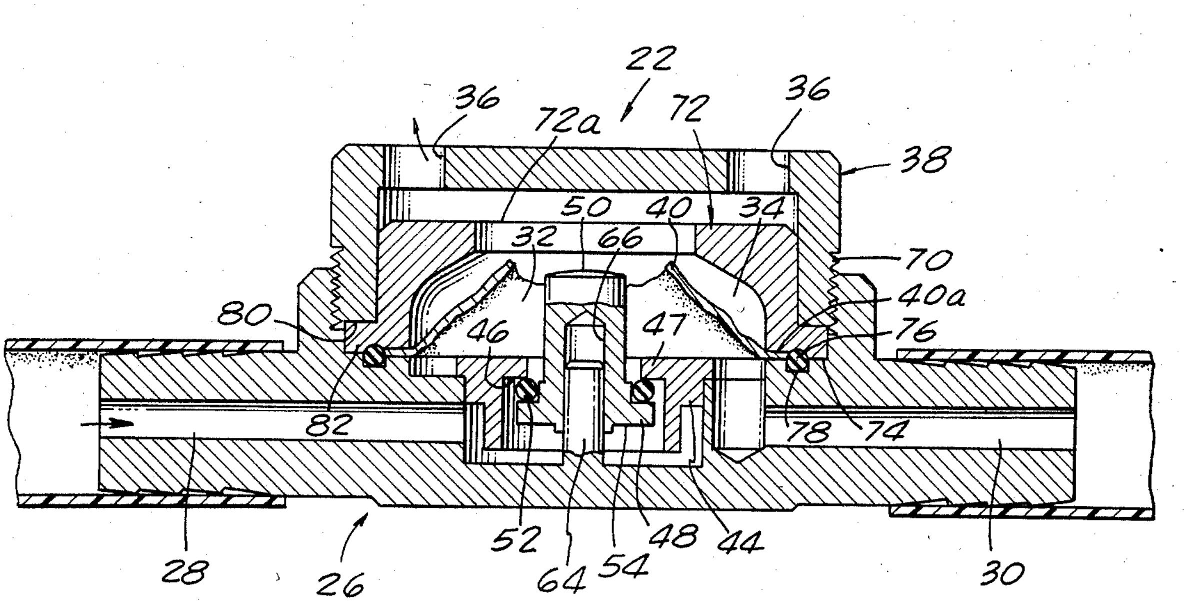
FIG. 4 is a side elevation cross-sectional view similar to FIG. 3, but showing the appearance of the component parts of the device after the frangible membrane has ruptured due to an excessive pressure condition in the line leading to the manifolding system.

Turning now to FIG. 4, there is illustrated the position of the various component parts of the device of the invention after the occurrence of an overpressurization of the pressure chamber 32 sufficient to cause the frangible disc 40 to rupture. As depicted in FIG. 4, when the rupture disc 40 ruptures the fluid pressure acting upon the first, or pressure, surface 54 of the valve member 48 will cause the valve member to be urged toward the second closed position shown in FIG. 4. In this position the elastomeric O-ring 52 has moved into sealing engagement with valve seat 46, thereby preventing further flow of fluid from the inlet 28 through the valve means into the pressure chamber 32.

A study of FIG. 4 will show that upon rupturing of the frangible disc 40 the fluid under pressure which is flowing through the device will flow from the pressure chamber 32 to atmosphere through apertures 36 in closure cap 38. This flow will continue for a brief moment until the valve means closes into the position shown in FIG. 4. At this point all further flow of fluid into the pressure chamber will be blocked by the valve means. It is apparent that any fluid under pressure downstream of the valve means will also be permitted to freely flow to atmosphere through the rupture disc and outwardly through apertures 36 provided in cap 38.

In the embodiment of the invention shown in the drawings, the valve body, the valve member, and the valve seat are generally circular in cross section at any point. Functioning to guide movement of the valve member 48 from the first closed position to the second open position is a centrally disposed, cylindrically shaped guide column 64 which is integrally formed with the housing 26. As indicated in FIGS. 3 and 4, valve member 48 is provided with a counter bore 66 which is of a diameter to closely telescopically receive guide column 64.

Upon failure of the rupture disc 40 and the movement of the valve into the closed position shown in FIG. 4, the valve will remain in a closed position due to the urging of fluid under pressure acting on surface 54 and therefore will prevent all further flow of fluid into pressure chamber 32 or to atmosphere through apertures 36.

Referring again to FIG. 1, it can be seen that if, for example, the rupture disc 40 of the device indicated as *22a* in FIG. 1 should fall, the dispensing of beer from the keg designated as keg *18a* will cease until corrective action is taken. It is to be noted, however, that with the system shown in FIG. 1 beer can continue to be dispensed through the remaining kegs which are interconnected with the manifold 40. It is also to be noted that because of the novel valving means of the invention no gas will be lost due to the failure of the rupture disc of device *22a*.

To accomplish necessary corrective action to the flow control device *22a*, it is necessary to close regulator *20a*. When this is done, cap 38 which is threadably interconnected with housing 26 by threads (designated in FIG. 3 by the numeral 70), can be removed. With cap 38 removed sub-body 72 can be removed from the unit. As best seen in FIG. 3, sub-body 72 is generally annular in shape having a clamping surface 74 which functions to clamp an annular flange portion *40a* of rupture disc 40 against a mating annular shape flat surface provided in body 26. To prevent fluid leakage past the flange portion of the rupture disc, a second elastomeric o-ring 76 is provided and is maintained in position in a circular groove 78 formed in body 26.

Once sub-body 72 has been removed from the device, a new frangible membrane or rupture disc 40 can be inserted into the unit, sub-body 72 replaced, and cap 38 rethreadably connected with body 26. As cap 38 is threaded into position a lower surface 80 thereof will act upon a flange 82 of sub-body 72 urging frangible disc 40 into sealable engagement with o-ring 76 and body portion 26, thereby providing a fluid seal which prevents leakage of fluid under pressure past the frangible disc into the vent chamber of the device.

Another novel feature of the apparatus of the present invention is the tamper preventative aspect of the invlention. As seen in FIG. 3, the upper portion 72*a* of the sub-body 72 defines an annular shaped protective plate 72*a* which is disposed intermediate rupture disc 40 and the vent apertures 36 provided in cap 38. With this arrangement a tortuous path is formed between the rupture disc and the vent apertures. Due to this tortious path it is impossible for an object such as a screwdriver, ice pick or the like to be inserted through the apertures 36 and into contact with the rupture disc. Accordingly, intentional and malicious rupturing of the disc 40 by insertion of sharp objects through the vent apertures 36 is effectively prevented.

The housing, the valve seat, the valve member, the subbody 72 and the cap can be constructed of plastic, metal or other suitable materials. The guide column 64 can be integrally formed with the housing or it can be a separate component interconnected with the housing. The frangible membrane can be formed of thin metal or other suitable material.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. A flow control device for interconnection between a source of pressurized fluid and a container to be pressurized, comprising:

(a) a housing having an inlet adapted to communicate with the source of pressurized fluid and an outlet adapted to communicate with the container, said housing having a pressure chamber in communication with said inlet and said outlet and a vented chamber in communication with atmosphere;

(b) a frangible membrane separating said pressure chamber and said vented chamber, said frangible membrane being adapted to fail when a predetermined pressure is reached within said pressure chamber; and (c) valve means disposed in said housing in cooperative association with said frangible membrane for blocking the flow of fluid from said inlet into said pressure chamber when said frangible membrane fails.

2. A flow control device as defined in claim 1 in which said valve means comprises:

(a) a valve seat disposed within said pressure chamber intermediate said inlet and said outlet; and (b) a valve member operably associated with said valve seat and said frangible membrane, said valve member being movable by fluid pressure from a first position wherein said valve member is spaced from said valve seat to a second position wherein said valve member is in sealable engagement with said valve seat, said frangible membrane being so constructed and arranged as to block movement of said valve member to said second position until said frangible membrane fails.

3. A flow control device as defined in claim 2 in which said housing includes a centrally disposed guide column and in which said valve member is guided by said guide column during movement between said first and second position.

4. A flow control device as defined in claim 3 in which said valve member includes a first surface adapted to be acted upon by fluid under pressure and a spaced apart second surface adapted to pressurally engage said frangible membrane.

5. A flow control device as defined in claim 3 in which said housing includes a closure cap partially closing said vented chamber, said closure cap having a plurality of vent apertures located about the perimeter thereof.

6. A flow control device as defined in claim 5 in which said housing further includes an annular shaped protective plate disposed intermediate said frangible membrane and said vent apertures so that a tortious path is formed between said frangible membrane and said vent apertures.

7. A flow control device for interconnection between a source of pressurized fluid and a container to be pressurized, comprising:

(a) a housing having an inlet adapted to communicate with the source of pressurized fluid and an outlet adapted to communicate with the container, said housing having a pressure chamber in communication with said inlet and said outlet and a vented chamber in communication with atmosphere;

(b) a rupture disc separating said pressure chamber and said vented chamber, said rupture disc being adapted to fail when a predetermined pressure is reached within said pressure chamber; and (c) valve means disposed in said housing in cooperative association with said rupture disc for blocking the flow of fluid from said inlet into said pressure chamber when said rupture disc fails, said valve means comprising:

(i) a valve body having a circularly shaped seat disposed within said pressure chamber intermediate said inlet and said outlet; and (ii) a generally cylindrically shaped valve member having a seat engaging portion adapted to sealably engage said valve seat and having a spaced apart surface normally in engagement with said rupture disc, said valve member being movable by fluid pressure from a first position wherein said valve means is open to a second position wherein said valve means is closed, said rupture disc being so constructed and arranged as to block movement of said valve member to said second position so long as said rupture disc is intact.

8. A flow control device as defined in claim 7 in which said valve member has a first surface adapted to be acted upon by fluid entering said housing through said inlet, said first surface being axially spaced from said surface normally in engagement with said rupture disc, said seat engaging portion being disposed intermediate said surfaces.

9. A flow control device for use with a beverage dispensing system for interconnection between a source of pressurized gas and a beverage container to be pressurized, comprising:

(a) a housing having an inlet adapted to communicate with the source of pressurized gas and an outlet adapted to communicate with the beverage container, said housing having a pressure chamber in communication with said inlet and said outlet and a vented chamber in communication with atmosphere;

(b) a frangible disc separating said pressure chamber and said vented chamber; said frangible disc being adapted to fail when a predetermined pressure is reached within said pressure chamber;

(c) valve means disposed in said housing in cooperative association with said frangible disc for blocking the flow of gas from said inlet into said pressure chamber when said frangible disc fails, said valve means comprising:

(i) a valve body having a circularly shaped seat disposed within said pressure chamber intermediate said inlet and said outlet; and (ii) a generally cylindrically shaped valve member having a seat engaging portion adapted to sealably engage said valve seat and having a spaced apart surface normally in engagement with said frangible disc, said valve member being movable by gas pressure from a first position wherein said valve means is open to a second position wherein said valve means is closed, said frangible disc being so constructed and arranged as to block movement of said valve member to said second position so long as said frangible disc is intact;

(d) a closure cap partially closing said vented chamber, said closure cap having a plurality of vent apertures located about the perimeter thereof; and (e) an annular shaped protective plate disposed intermediate said frangible disc and said vent apertures so that a tortious path is formed between said frangible disc and said vent apertures.

10. A flow control device as defined in claim 9 in which said housing includes a centrally disposed guide column and in which said valve member is provided with a centrally disposed axially extending bore adapted to be telescopically received over said guide column.

* * * * *